J. L. CREVELING.
ELECTRIC SYSTEM.
APPLICATION FILED SEPT. 30, 1909.
1,143,176.
Patented June 15, 1915.
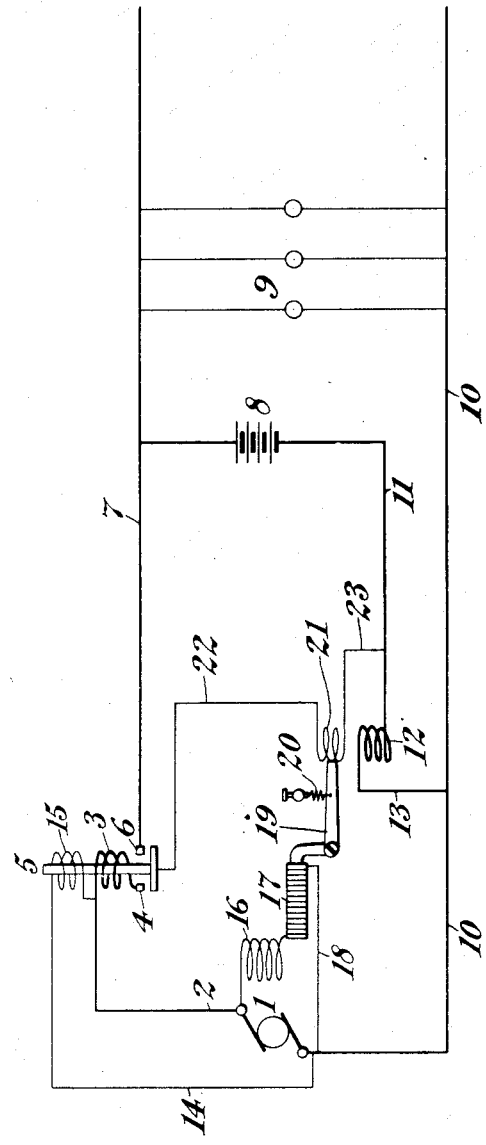
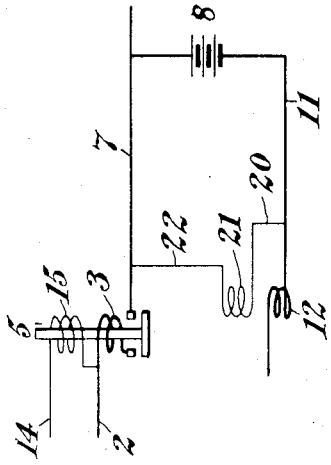
Witnesses:
Inventor
John L. Creveling

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC SYSTEM.

1,143,176.  Specification of Letters Patent.  Patented June 15, 1915.

Application filed September 30, 1909. Serial No. 520,273.

*To all whom it may concern:*

Be it known that I, JOHN L. CREVELING, a resident of New York, in the county and State of New York, have invented certain new and useful Improvements in Electric Systems, as set forth in the annexed specification and drawing forming a part thereof.

My invention pertains to that class of electric systems wherein a generator is used to charge a storage battery and supply current to lamps or other translating devices.

My invention has for its particular object to provide means whereby a generator driven at variable speeds may be operated to automatically deliver a predetermined current to the storage battery regardless of the current consumed by the lamps or other translating devices and not have the operation of the means for thus regulating the dynamo rendered detrimental by current flowing from the battery to the lamps or translating devices when the generator is inoperative or run at such speed that it supplies only a portion of the current consumed in the system.

Figure I is a diagram setting forth a system embodying my invention. Fig. II is a diagram of a portion of a system similar to Fig. I in which a slight modification appears as will hereinafter be explained.

Referring to the drawing, particularly Fig. I, 1 represents a dynamo or generator in which the positive lead 2 is carried to the coil 3 terminating in the contact 4 of any suitable type of automatic switch as indicated at 5. From the other contact 6 of the said switch the main 7 is led to the positive terminal of the storage battery 8 and lamps or other translating devices indicated at 9. From the other terminal of the translating devices the lead 10 is carried to the negative brush of the generator 1. The negative side of the storage battery 8 is connected with the conductor 11 which leads to the coil 12 which the wire 13 connects with the lead 10. The automatic switch 5 may be provided with any suitable operating coil as indicated at 15 and connected with the lead 10 as by the wire 14.

16 represents the field coil of the generator which may be connected with one brush of the generator as indicated and terminate in any suitable type of variable resistance 17, in this instance indicated of the carbon disk variety for sake of clearness. The other side of the variable resistance 17 is connected with the opposite brush of the generator as by means of wire 18. The lever 19 is normally drawn in an upward direction by the adjustable spring 20 so as to tend to compact the carbons 17 and reduce the resistance thereof.

21 represents a coil carried by the lever 19 and connected with the contact member of the switch 5 as by wire 22 and with the conductor 11 as by wire 23.

Referring to Fig. II the same shows a portion of the system shown in Fig. I in which like numerals indicate like parts and the portion of the system shown is identical with that shown in Fig. I with the exception that the wire 22 instead of connecting with the contact member of the switch 5 is connected directly to the main 7.

The practical operation of my improved system is substantially as follows reference being had to Fig. I and starting with the generator at rest and current supplied to the lamps or translating devices by the battery 8: The current passing from the battery 8 through the lamps 9, lead 10, wire 13, coil 12 and conductor 11 to the battery will cause the coil 12 to set up a magnetic flux in a given direction which may be determined and the strength of which will be a direct function of the current used by the lamps or translating devices. If the generator be started and brought to the proper voltage, the coil 15 will cause the switch 5 to close and if this voltage be slightly in excess of that of the storage battery a small current may flow from the generator through lead 2, coil 3, switch 5, main 7, translating devices 9, lead 10 to the generator which will cause a slight diminution in the amount of current flowing from the storage battery through the lamps or translating devices as above outlined. At this time, current will also flow from the main 7, through the wire 22, coil 21 and wire 23, to the conductor 11, and thence to the battery 8; in other words, a part of the generator current, instead of passing from the switch 5 directly through the main 7, is shunted through the wire 22, coil 21, conductor 11 and battery 8 to the translating devices 9. The battery 8 will continue to supply current to the translating devices and its circuit will be completed through the conductor 13, coil 12 and conductor 11. The current flowing through the coil 21 will cause the same to tend to set up a magnetic flux, the direction of which may be predetermined and is so chosen as to oppose the flux set up by the coil 12 when current flows from the battery 8 to the lamps or translating devices as above set forth. Therefore, under these conditions above outlined, coil 21 and coil 12 will tend to repel each other and they may be caused to exert force in such direction as to tend to assist the spring 20 in compacting the variable resistance 17 so as to reduce the resistance in the field circuit and cause the generator output to tend to rise. If the speed of the generator be increased and its output increased until it is supplying the total current to the lamps or translating devices there will be no current flowing in the coil 12 and the same will have no action upon the coil 21. If the generator voltage increase, current will now flow into the battery so as to charge the same and will flow through the coil 12 in a direction opposed to that when the current was supplied from the battery to the lamps or translating devices. This will reverse the flux set up by the coil 12 which will now be in the same direction as that set up by the coil 21 and the two coils will attract each other. Therefore, it will be seen that the magnetic effect of the coils 12 and 21 is either of a conjoint or differential nature, dependent upon the current flow from the generator or from the battery, or upon the number of translating devices in use. By properly arranging the lever 19 and properly adjusting the spring 20 this attraction between the coils 21 and 12 may be caused to move the lever 19 when a predetermined current is being supplied to the battery in such manner as to increase the resistance 17 and cut down the generator field so as to hold the current supplied to the battery practically constant throughout further increases in speed of the generator and if the generator shall slow down until it is not supplying the entire current to the translating devices that portion supplied from the battery will pass through the coil 12 in such manner as to again repel coil 21 and assist the spring 20 in reducing the resistance in the field so long as both the generator and battery are supplying current to the translating devices. If the generator slow down until its voltage be practically equal or slightly less than that of the battery the switch 5 may be caused to open and current will no longer flow through the coil 21 and the battery 8 will alone supply the lamps or translating devices.

The operation of the modification shown in Fig. II will readily be understood from the above description of the operation of the system shown in Fig. I, the only difference being that when the generator is not supplying current some current will flow from the battery through the coil 21 inasmuch as its circuit is not opened by the opening of the main switch 5.

From the above description of my invention it will be obvious that current supplied to the battery by the generator will tend to cut down the generator voltage and the system may be arranged so as to cut down the voltage when the battery is receiving a predetermined desired current maximum and when the battery is supplying part of the current to the lamps or translating devices, its current tends to increase the voltage of the generator so as to tend to make it supply more current and relieve the battery of part of its load. Also it will be obvious that as the voltage of the battery rises due to charging, the current in the coil 21 will tend to increase and thereby cause the attraction between the said coil and the coil 12 to serve to cut down the generator voltage with less current flowing in the coil 12 so that as the voltage of the battery rises the charging current will be automatically cut down and thus give the battery a desired tapering charge.

I do not wish in any way to limit myself to any exact details of construction or precise mode of operation set forth in the above specification or shown in the drawing, the same being intended to merely set forth one form of apparatus embodying my invention in which great alteration and variation may be made without departing from the spirit thereof.

Having thus described my invention those features which I consider novel and desire to protect by Letters Patent are as set forth in the following claims to wit:

1. The combination with a generator, a regulating element therefor, a storage battery and a work circuit, of means for controlling said element comprising devices for attracting and repelling each other, whereby current flowing into the battery from the generator tends to cause the generator output to be decreased, and current flowing from the battery to the work circuit tends to cause the generator output to be increased.

2. The combination with a generator, a regulating element therefor, a storage battery and a work circuit, of means for controlling said element comprising devices movably mounted with relation to each other and adapted to act conjointly or differentially, whereby current flowing into the battery from the generator tends to cause the generator output to be decreased, and current flowing from the battery to the work circuit tends to cause the generator output to be increased.

3. The combination with a generator, a regulating element therefor, a storage battery and a work circuit, of means for controlling said element comprising devices connected to attract each other to cause the generator output to be decreased when current flows into the battery from the generator, and to repel each other to cause the generator output to be increased when current flows from the battery to the work circuit.

4. The combination with a generator, a regulating element therefor, a storage battery and a work circuit, of means for controlling said element comprising relatively movable devices adapted to act conjointly to cause the generator output to be decreased when current flows into the battery from the generator, and to act differentially to cause the generator output to be increased when current flows from the battery to the work circuit.

5. The combination with a generator, a regulating element therefor, a storage battery and a work circuit, of means for controlling said element comprising a pair of coils connected to attract and repel each other, whereby current flowing into the battery from the generator tends to cause the generator output to be decreased, and current flowing from the battery to the work circuit tends to cause the generator output to be increased.

6. The combination with a generator, a regulating element therefor, a storage battery and a work circuit, of means for controlling said element comprising coils connected to attract each other to cause the generator output to be decreased when current flows into the battery from the generator, and to repel each other when current flows from the battery to the work circuit to tend to cause the generator output to be increased.

7. The combination with a generator, a regulating element therefor, a storage battery and a work circuit, of means for controlling said element comprising relatively movable coils, whereby current flowing into the battery from the generator tends to cause the generator output to be decreased, and current flowing from the battery to the work circuit tends to cause the generator output to be increased.

8. The combination with a generator, a regulating element therefor, a storage battery and a work circuit, of means for controlling said element comprising relatively movable coils connected to act conjointly when current flows into the battery from the generator to tend to cause the generator output to be decreased, and to act differentially when current flows from the battery to the work circuit, whereby to cause the generator output to be increased.

9. The combination with a generator, a storage battery and a work circuit, of a regulator for the generator provided with a plurality of actuating coils having interacting magnetic fields for controlling the regulator and connections for said coils with the generator and the work circuit, whereby when one coil is inert current in another coil will not affect the regulator.

10. The combination with a generator, a storage battery and a work circuit, of a regulator for the generator provided with a plurality of actuating coils having interacting magnetic fields for controlling the generator, and means for controlling the connection of said parts including the connection of the generator with the work circuit for preventing current in one of the coils from affecting the regulator when the other coil is inert.

11. The combination with a generator, a storage battery and a work circuit, of a regulator for the generator comprehending a coil in series with the battery and a coil in shunt to the battery, the operation of which is determined by the coil in series with the battery coöperating with the coil in shunt to the battery and attracting or repelling said shunt coil depending upon whether the current is flowing from the generator to the battery or from the battery to the work circuit.

12. The combination with a generator, a storage battery and a work circuit, of a regulator for the generator, means for operating said regulator comprising a movable coil across a circuit of substantially constant electro-motive-force, a coil coöperating therewith to cause the same to move so arranged as to cause the movable coil to move in one direction when current flows from the generator to the battery and in an opposite direction when current flows from the battery to the work circuit.

JOHN L. CREVELING.

Witnesses:
E. HALL,
M. HERSKOVITZ.